US011200157B1

(12) United States Patent
Mathew et al.

(10) Patent No.: US 11,200,157 B1
(45) Date of Patent: Dec. 14, 2021

(54) AUTOMATED EXECUTION REPORTING FOR CONTAINER BUILDS

(71) Applicant: Amazon Technologies, Inc., Seattle, WA (US)

(72) Inventors: Subin Mathew, Seattle, WA (US); Paul J Canup, Seattle, WA (US); Ziwei Zhou, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 13 days.

(21) Appl. No.: 16/573,924

(22) Filed: Sep. 17, 2019

(51) Int. Cl.
*G06F 11/36* (2006.01)
*G06F 8/41* (2018.01)

(52) U.S. Cl.
CPC .......... *G06F 11/3692* (2013.01); *G06F 8/41* (2013.01); *G06F 11/3612* (2013.01); *G06F 11/3688* (2013.01)

(58) Field of Classification Search
CPC .......... G06F 11/3692; G06F 11/3612; G06F 11/3688; G06F 8/41
See application file for complete search history.

(56) References Cited

U.S. PATENT DOCUMENTS

| 8,037,453 | B1* | 10/2011 | Zawadzki | G06F 8/71 717/123 |
| 8,185,877 | B1* | 5/2012 | Colcord | G06F 11/3692 717/127 |
| 9,390,260 | B2* | 7/2016 | Tan | G06F 9/30061 |
| 9,495,642 | B1* | 11/2016 | Smith | G06F 16/248 |
| 10,540,174 | B2* | 1/2020 | Mathew | G06F 8/71 |
| 10,949,562 | B2* | 3/2021 | Bendory | G06F 21/629 |
| 2004/0153822 | A1* | 8/2004 | Arcand | G01R 31/318307 714/38.14 |
| 2005/0102323 | A1* | 5/2005 | Henderson | G06F 11/3692 |

(Continued)

OTHER PUBLICATIONS

Celesti et al., "Exploring Container Virtualization in IoT Clouds", 2016, IEEE (Year: 2016).*

(Continued)

*Primary Examiner* — Anna C Deng
*Assistant Examiner* — Junchun Wu
(74) *Attorney, Agent, or Firm* — Nicholson De Vos Webster & Elliott LLP

(57) ABSTRACT

Systems and methods for building and testing software projects within a virtual computing environment of a computing resource service provider, providing for gathering, reporting, and summarization of test results generated by test runs executed as part of the build process are disclosed. A user makes requests to a build service provided by the computing resource service provider which automates building and testing of program code for software modules and software projects including such modules. The build service receives the requests and allocates physical computing resources, such as usage of processors, memory, storage drives, computer network interfaces, and other components of hardware computing devices within a virtual computing environment to attempt to build the software modules and report results of tests performed during the build attempts. The user may supply program code to be built without otherwise needing to manage the virtual computing resources allocated to complete the requested tasks.

16 Claims, 9 Drawing Sheets

(56) References Cited

U.S. PATENT DOCUMENTS

| | | | | |
|---|---|---|---|---|
| 2008/0282231 | A1* | 11/2008 | R .................... | G06F 11/3684 |
| | | | | 717/127 |
| 2012/0166876 | A1* | 6/2012 | Zambrana ........... | G06F 11/3612 |
| | | | | 714/32 |
| 2013/0152047 | A1* | 6/2013 | Moorthi ............... | G06F 11/368 |
| | | | | 717/124 |
| 2014/0109050 | A1* | 4/2014 | Gibbens .............. | G06F 11/0772 |
| | | | | 717/124 |
| 2014/0109063 | A1* | 4/2014 | Schissel ............. | G06F 11/0712 |
| | | | | 717/127 |
| 2016/0147645 | A1* | 5/2016 | Kandpal ............. | G06F 11/3688 |
| | | | | 717/124 |
| 2018/0322037 | A1* | 11/2018 | Thazhathekalam ....................... | |
| | | | | G06F 11/3684 |
| 2019/0187982 | A1* | 6/2019 | Mathew ................... | G06F 8/41 |
| 2019/0294477 | A1* | 9/2019 | Koppes ................ | G06F 9/5072 |

OTHER PUBLICATIONS

Salah et al., "Performance Comparison between Container-based and VM-based Services", 2017, IEEE (Year: 2017).*
Anderson et al., "Performance Considerations of Network Functions Virtualization using Containers", 2016, IEEE (Year: 2016).*
Visser et al., "Test Input Generation for Java Containers using State Matching", 2005, ACM (Year: 2005).*

* cited by examiner

AUTOMATED EXECUTION REPORTING FOR CONTAINER BUILDS

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual computing resources, such as virtual machines that appear and operate as independent computing devices to users of a data center. The single physical computing device can create, maintain, delete, or otherwise manage virtual resources in a dynamic manner. In some scenarios, various virtual machines may be associated with different combinations of operating systems or operating system configurations, virtualized hardware and networking resources, and software applications, to enable a physical computing device to provide different desired functionalities, or to provide similar functionalities more efficiently.

In turn, users can request computer resources from a data center, including single computing devices or a configuration of networked computing devices, and be provided with varying numbers of virtual machine resources. Virtualization also scales upward from virtual machines; entire data centers and even multiple data centers may implement computing environments with varying capacities, such as a virtual private network and a virtual private "cloud" computing environment. A network of hardware computing devices can cooperatively use virtualization technologies to provide virtual computing resources and computing services to users of a computing resource service provider. Access to resources and data can be tightly controlled by a user account owner, an administrator, a group, a service, or the computing resource service provider itself; access can be based on many different parameters, such as user credentials, resource attributes, network configurations, and the like.

The provision of virtual computing resources as discrete instances configured for use as if they were typical data center hardware components, such as servers, disk storage, and network adapter cards, is known as infrastructure as a service (IaaS). An IaaS provider can also provide backend computing architecture implementing computing resources and services for, among other things, billing and account management, networking support such as monitoring and load balancing, security, backup and redundancy, and resource configurations and interoperability frameworks. A user can invoke these resources and services to create workflows, automate tasks, monitor and update deployed infrastructure, and otherwise manage its computing resources. An IaaS framework can enable a user to manage its infrastructure programmatically, a concept known as infrastructure as code (IaC). The "code" in IaC is machine-readable instructions organized as discrete definitions for each infrastructure component; the provider's virtual resource management service executes the instructions to rapidly provision, configure, and deploy instances of a virtual computing resource. IaC automates infrastructure deployment and combats configuration drift by conforming virtual resource instances to the corresponding definition.

Services related to the building and testing of software modules and projects may be provided within the context such cloud computing and IaaS environments. A user may submit program code via a user interface to a computing resource service provider which allocates virtualized computing resources to perform tasks such as compilation of program code into software applications and depositing resulting executable files and other artifacts in a datastore for retrieval by the user or distribution to others on the user's behalf.

BRIEF DESCRIPTION OF THE DRAWINGS

Various techniques will be described with reference to the drawings, in which.

DETAILED DESCRIPTION

Figure 1A:
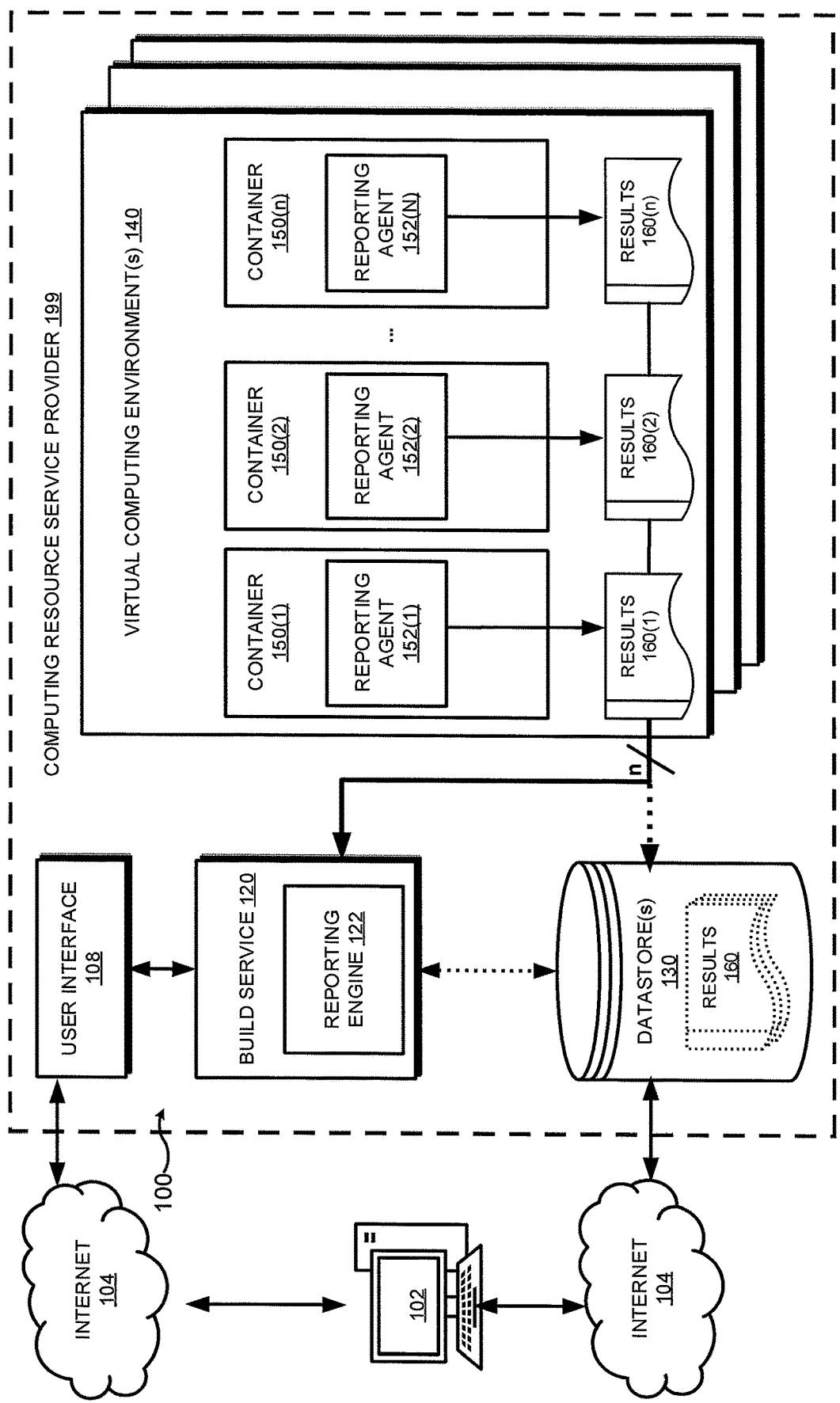
FIG. 1A is a diagram of a computing environment of a computing resource service provider, in which various embodiments of the present systems and methods can be implemented in accordance with this disclosure.

In the context of a computing resource service provider, a client makes requests to have computing resources of the computing resource service provider allocated for the client's use. One or more services of the computing resource service provider receive the requests and allocate physical computing resources, such as usage of a computer processor, memory, storage drives, computer network interfaces, and other components of a hardware computing device, to the client. In some computing systems, a virtualization layer of the computing system generates instances of "virtual" computing resources that represent the allocated portion of corresponding physical computing resources. In this infrastructure as a service (IaaS) environment, the client may operate and control, as its own computing infrastructure, instances of virtual computing resources, including without limitation: virtual machine instances each emulating a complete computing device having an operating system, processing capabilities, storage capacity, and network connections; virtual machine instances or other containers for performing specific processes; virtual network interfaces each enabling one or more virtual machine instances to use an underlying network interface controller in isolation from each other; virtual datastores operating like hard drives or databases; and the like. The computing resource service provider may provision the virtual computing resources to the client in the client's own virtual computing environment(s), which can be communicatively isolated (or restricted, e.g., via security policies) from the environments of other clients. The computing resource service provider may allow the client to configure its virtual computing resources, so they can receive connections from the computing devices of end users; the client's virtual computing resources can provide software applications, web services, and other computing services to the end users.

One or more services of the computing resource service provider may, as described further below, be responsible for allocating a virtual computing resource, configuring the virtual computing resource, and deploying the virtual computing resource into the client's virtual computing environment. An IaaS environment that implements infrastructure as code (IaC) concepts enables this resource management service to obtain a resource definition comprising program code, and interpret and execute the resource definition to identify the resource type, allocate the appropriate virtualized physical resources for a virtual resource instance of the corresponding type, apply a defined configuration to the virtual resource instance, and deploy the virtual resource instance into the virtual computing environment. Virtual computing resources are deployed into a client's virtual computing environment by creating the instance within corresponding resources allocated to the environment and connecting the instance to other virtual computing resources and sometimes also to computing networks that interface with end user devices. In one implementation, the virtualization layer (e.g., containing one or more hypervisors) of the computing system generates one or more virtual networks within the environment, and a new instance receives an address (e.g., an IPv4 address) on the virtual network and can then communicate with other components on the virtual network. The virtual network may be attended by physical or virtual networking components such as network interfaces, firewalls, load balancers, and the like, which implement communication protocols, address spaces, and connections between components and to external communication networks (e.g., the internet and other wide-area networks). In various implementations, a client can configure various aspects of the virtual network and its attendant components.

A computing resource service provider may also provide certain services transparently on behalf of a user or client. In such instances, the computing resource service provider manage certain resources within its own computing environment in connection with virtualized resources over which the user is provided with direct access or control. In one example, a user makes requests to the a build service provided by the computing resource service provider which automates building and testing of program code for software modules and software projects including such models. The build service receives the requests and allocates physical computing resources, such as usage of a computer processor, memory, storage drives, computer network interfaces, and other components of a hardware computing device with a virtual computing environment to attempt to build the requested software modules and report the results of tests performed while the build service attempts to build the requested software modules. The user may supply program code to be built and a request to build and test the resulting software module(s) without otherwise needing to manage the virtual computing resources allocated to complete the requested tasks.

The present disclosure provides systems and methods for building and testing software projects within a virtual computing environment (VCE) while providing for automatic gathering, reporting, and summarizing of test results generated by test runs executed as part of the build process.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Referring to FIG. 1A, embodiments of the present disclosure may operate within or upon computing systems of a computing resource service provider 199 accessible by a user 102 (represented by a user computing device) via a computer network 104 such as the Internet. The computing resource service provider 199 may provide various interfaces to the user 102 such as the user interface 108. The user interface 108 may be provided via websites, web applications, command consoles, and application programming interfaces (APIs) and the like, as described further below. The user 102 interacts via the user interface 108 with a build service 120 operating within the computing environment 100 of the computing resource service provider 199. Various virtual computing environments 140, may be provided within the computing environment 100 of the computing resource service provider 199. The build service 120 is a service provided by the computing resource service provider 199 to manage building software modules and larger software projects on behalf of users, such as the user 102. The user 102 may transmit one or more requests 105 to the build service 120 to build software modules.

The build service 120 may access various datastores provided by the computing resource service provider 199 for use by the user 102, such as the datastore(s) 130. In some embodiments, one more datastores 130 may be provided by a third party, such as another computing resource service provider. In certain embodiments, one or more datastores 130 may be a source control system operated by the user 102 or a third party on behalf of the user 102, as non-limiting examples. The build service 120 may control instantiation of one or more container instances 150 in order to perform operations required to build and test software modules within virtual computing environments 140. In some embodiments, a virtual computing environment 140 may be provided by a virtual machine instance. Container instances, 150 represented by the containers {150(1), 150(2), . . . , 150(n)} may operate within any suitable virtual computing environment 140 including a virtual machine. In some embodiments, full virtual machine instances may replace container instances. Reporting agents 152 represented by the reporting agents {152(1), 152(2), . . . , 152(n)} may operate with the containers 150 used to build software modules, execute performance tests on those modules, and output test results 160 of those tests represented by the test results {160(1), 160(2), . . . , 160(n)}. Reporting agents 152 may store the test results 160 (as well as other information and objects not shown such as build artifacts and compiled code) in the datastore(s) 130 for use by the build service 120, the user 102, and/or others granted access to the datastore(s) 130 on behalf of the user 102. As shown, the build service 120 may include a reporting engine 122 which accesses the test results 160 in order to generate a test report 170 requested by the user 102 and delivered to the user 102 via the user interface 108. The computing resource service provider 199 may include data processing architecture that implements systems and services that operate "outside" of any particular virtual computing environment and perform various functions, such as managing communications to the virtual computing environments, providing electronic data storage, and performing security assessments and other data analysis functions. These systems and services may communicate with each other, with devices and services outside of the computing resource service provider 199, and/or with the computing environments. It will be understood that services depicted in the Figures as inside a particular virtual computing environment 140 or outside all virtual computing environments may be suitably modified to operate in the data processing architecture in a different fashion that what is depicted.

In general, the user 102 can access the user interface 108 via any computing device such as a desktop, laptop, mobile phone (or smartphone), tablet, kiosk, wireless device, and other electronic devices. Such computing devices may include web services running on the same or different data centers, where, for example, different web services may programmatically communicate with each other to perform one or more techniques described herein. The user interface 108 may be realized using one more approaches, including CLIs, APIs, and/or other programmatic interfaces.

A network 104 that connects a device of the user 102 to the computing resource service provider 199 may be any wired network, wireless network, or combination thereof. In addition, the network 104 may be a personal area network, local area network, wide area network, over-the-air broadcast network (e.g., for radio or television), cable network, satellite network, cellular telephone network, or combination thereof. In some embodiments, the network 104, may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Accordingly, a user 102 may access the computing resource service provider 199 via a user interface 108, which may be any suitable user interface that is compatible with the computing device of the user 102 and the network 104, such as an API, a web application, web service, or other interface accessible by the computing device of the user 102 using a web browser or another software application, a command line interface, and the like. In some embodiments, the user interface 108 may include code and/or instructions for generating a graphic console on computing device of the user 102 using, for example, markup languages and other common web technologies. The user interface 108 may, via the computing device of the user 102, present a user with various options for configuring, requesting, launching, and otherwise operating functions provided by the build service 120 to build and test software modules and may present a user with static, dynamic, and/or interactive content. User input (e.g., text, computer files, selected elements from a list or menu, mouse clicks on buttons, and other interactions) entered into the user interface 108 by the user 102 may be received and processed by the build service 120 of the computing resource service provider 199, or by processes operating within the virtual computing environment(s) 140. For example, the client may use the user interface 108 to provide the request 105 to the build service 120 and configure operation of the build service 120 by selecting from configuration options displayed by the user interface 108. The user 102 may also use the user interface 108 to upload and download files to and from datastores such as the datastore(s) 130. The user 102 may also use the user interface to view and interact with test reports such as the example test reports illustrated shown FIGS. 6 and 7 as described further below.

Figure 1B:
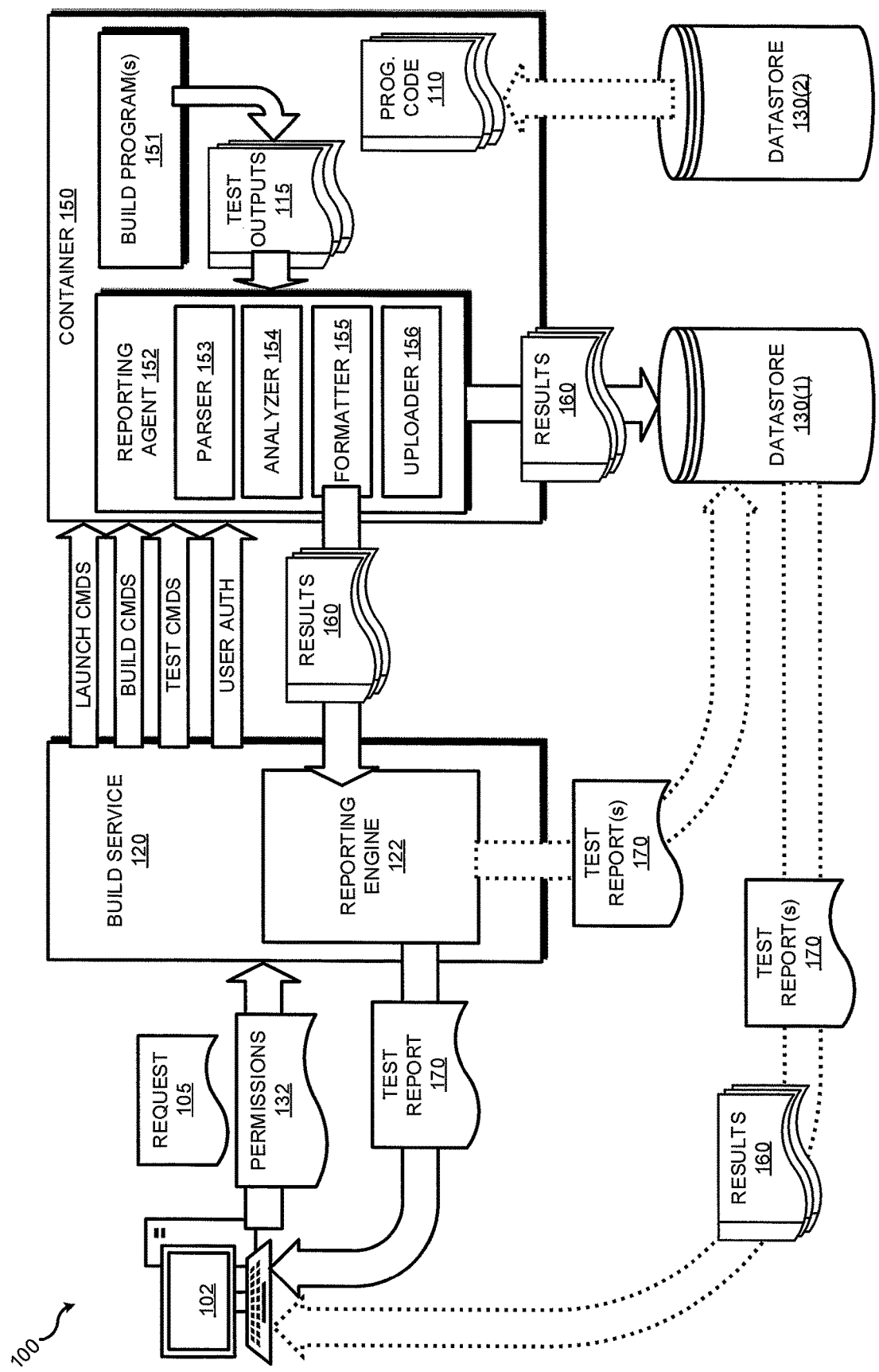
FIG. 1B is a flowchart illustrating interactions between elements shown in FIG. 1A.

FIG. 1B is a simplified block-level representation of interactions between the user 102 and functions provided by the computing resource service provider 199, as shown in FIG. 1A. Referring to FIG. 1B, the user 102 may provide a request 105 to the build service 120. The build service 120 instantiates a build container 150 which is supplied with the program code 110 for the software module(s) to be built and tested. Some embodiments may include datastores 130 such the example datastores 130(1) and 130(2) provided by the computing resource service provider 199. In embodiments such as the embodiment of FIG. 1B, the datastore 130(2) may function as a separate program code repository.

The build service 120 provides the request 105 to a reporting agent 152 executed by the build service 120 (which operates within a virtual container 150 as shown in FIG. 1A). The build service 120 may attempt to the build program code 110 into executable software modules. These software modules may be standalone modules or may form parts of larger software projects. Attempts to build software modules from the program code 110 and run tests described by the request 105 or by information stored in the build container 150 may produce test outputs 115. The request 105 may be used by the reporting agent 152 to determine one or more locations in a file system of the container 150 from which the test outputs 115 may be obtained. A request such as the request 105 may be expressed in a language-independent format such as JSON or YAML. Examples discussed in this disclosure may be in JSON format or in a format similar to JSON and as illustrations of various embodiments which may be implemented. Of course, various other formats which may be utilized in the manner described in connection with JSON and JSON-like formats are also contemplated and within the scope of this disclosure. In some embodiments, the test request 105 causes the build service 120 to build and test a particular software module by identifying a particular container 150 which is preconfigured by the user 102, or by the build service 102 in response to previous instructions or requests from the user 102, to build a requested software module from program code 110 and perform tests specified by the user 102. The request 105 may include user-specified identifiers associated with particular tests, types of tests, or collections of tests (i.e., "test runs"). In such embodiments the request 105 causes the build service 120 to instantiate a build container 150 from an image which includes instructions to a build program 151 to perform specific tests, as described further below. Identifiers such as those mentioned above may be included in test results 160 and test reports 170, to allow the reporting engine 122 to filter and aggregate information from various test results 160 and test reports 170 to create customized user-requested test reports 170.

FIG. 1B shows elements of FIG. 1A in greater detail. The reporting agent 152 operates within a build container 150 which is supplied with the program code 110 of the software module(s) to be built and tested. In some embodiments, the user 102 may supply a container image used to instantiate the build container 150 with the program code 110. The user 102 may similarly supply the container image of the build container 150 with the reporting agent 152. In other embodiments, the build service 120 may install the reporting agent 152 into a previously-provided container used to instantiate the build container 150. In other embodiments, the build service 120 may use a container image supplied by the computing resource service provider 199 to instantiate the build container 150. In such embodiments, the build service 120 may obtain the program code 110 directly from the user 102 (via the user interface 108) or may optionally retrieve the program code 110 from a location in a datastore such as the datastore 130(2), which may be a program code repository operated by the user 102, by the computing resource service provider 199 on behalf of the user 102, or by a third party on behalf of the user 102. In such embodiments, the user 102 may specify the location of the datastore(s) via the user interface 108. In other embodiments, the build container 150 or request 105 may contain a location of a datastore, such as the datastore 130(2), from which to retrieve the program code 110. In some embodiments, the user 102 may determine access permissions 132 and provide them to the computing resource service provider 199 to control access to datastores (e.g., datastores 130, 130(2)) and other resources. The permissions 132 may specify additional users associated with the user 102 along with which resources those additional users may access. As a non-limiting example, some users may able to access certain of the test results 160 but not others. As a further non-limiting example, some users may be permitted to request a test report 170 but may not be permitted to issue a build request on behalf the user 102. Access to the program code 110 may be similarly restricted by the user 102 via the permissions 132.

The build container 150 may execute build program(s) 151 in a virtual computing environment 140 which build software modules using the program code 110. In some embodiments, the build program(s) 151 may be standalone software applications. In other embodiments, the build program(s) 151 may be instructions written in a scripting language (e.g., shell scripts) which cause the virtual computing environment 140 or the build container 150 to execute built-in functions of the virtual computing environment(s) 140 or the build container 150 for compiling the program code 110. In some embodiments, certain elements of the build program(s) 151 are realized by execution of compiled portions of the program code 110.

The reporting agent 152 may execute various functions. In some embodiments, the reporting agent 152 includes a parser 153, an analyzer 154, a formatter 155, and an uploader 156. In such embodiments, the parser 153 interprets the request 105 received from the user 102 via the build service 120. The reporting agent 152 may use information supplied by the parser 153 to perform required operations such as retrieving the test outputs 115 from tests collectively forming a test run while the build service 120 builds or attempts to build a software module using the program code 110 by executing a build container 150. The program code 110 may include one or more software testing frameworks which produce test outputs 115 when executed as part of build process. Typically, these test outputs 115 may be stored in log files produced having names and locations identified by the request 105. The analyzer 154 reads the test outputs 115 and interprets them using an expected format of the test outputs 115. For example, the analyzer 154, may implement rules to determine the current status of a particular test based upon the test outputs 115 output by the one or more test frameworks in a corresponding structured output format such as XML. The analyzer 154 may then call the formatter 155 which places the status information derived from the raw test outputs 115 into a desired format which may be used to form part of a test report 170 which will be provided to the user 102 by build service 120. The reporting agent 152 may also optionally include an uploader 156 which saves the formatted output of the analyzer 154 to the datastore 130. The uploader 156 may also upload the raw test outputs 115 to the datastore 130 and make the test outputs 115 and test results 160 directly available to the user 102 in machine-readable formats. In some embodiments, the reporting agent 152 repeatedly updates the test results 160 prior to completing a test run and invokes the reporting engine 122 to refresh the test report 170 (via an API call to the build service 120, for example), thereby allowing a user 102 to be provided with real-time status indications for a particular test run. In some embodiments, the reporting engine 122 may optionally store current and past test reports 170 in a datastore such as the datastore 130, as shown in FIG. 1B.

During the build process, a reporting agent 152 may produce test results 160 corresponding to outcomes of tests executed as a result of receiving the request 105. The reporting agent 152 may store the results 160 in the datastore 130 to enable the build service 120 and the user 102 to access the results 160. In some embodiments, multiple datastores such as the datastores 130(1) and 130(2) may be employed, as depicted by FIG. 1B. For example, the program code 110 for the software project may be stored in one datastore, such as the datastore 130(2) while the test results 160 may be stored in another datastore such as the datastore 130 of FIGS. 1A and 1B. This may be useful when a user 102 desires other authorized users to be provided with access to one or both of the program code 110 for the software project and the test results 160. The test results 160 and other data may be provided directly to the user 102 and others via a datastore such as the datastore 130. The results may also be provided in the form of a test report 170 generated by a reporting engine 122 of the build service 120, as shown in FIG. 1B.

In some embodiments, the build service 120 may execute multiple test runs within respective build containers 150, allowing a user 102 to run multiple builds, either sequentially or concurrently. In some embodiments, the build service 120 may determine that the individual builds are related or may otherwise receive instructions from the user 102 that the test results 160 retrieved by the reporting engine 122 should be integrated into a single test report 170. In some embodiments, the build service 120 may determine that a single software project includes individual modules which may be built and testing concurrently in distinct build containers 150 and integrate the individual test results 160 into a single test report 170.

Figure 2:
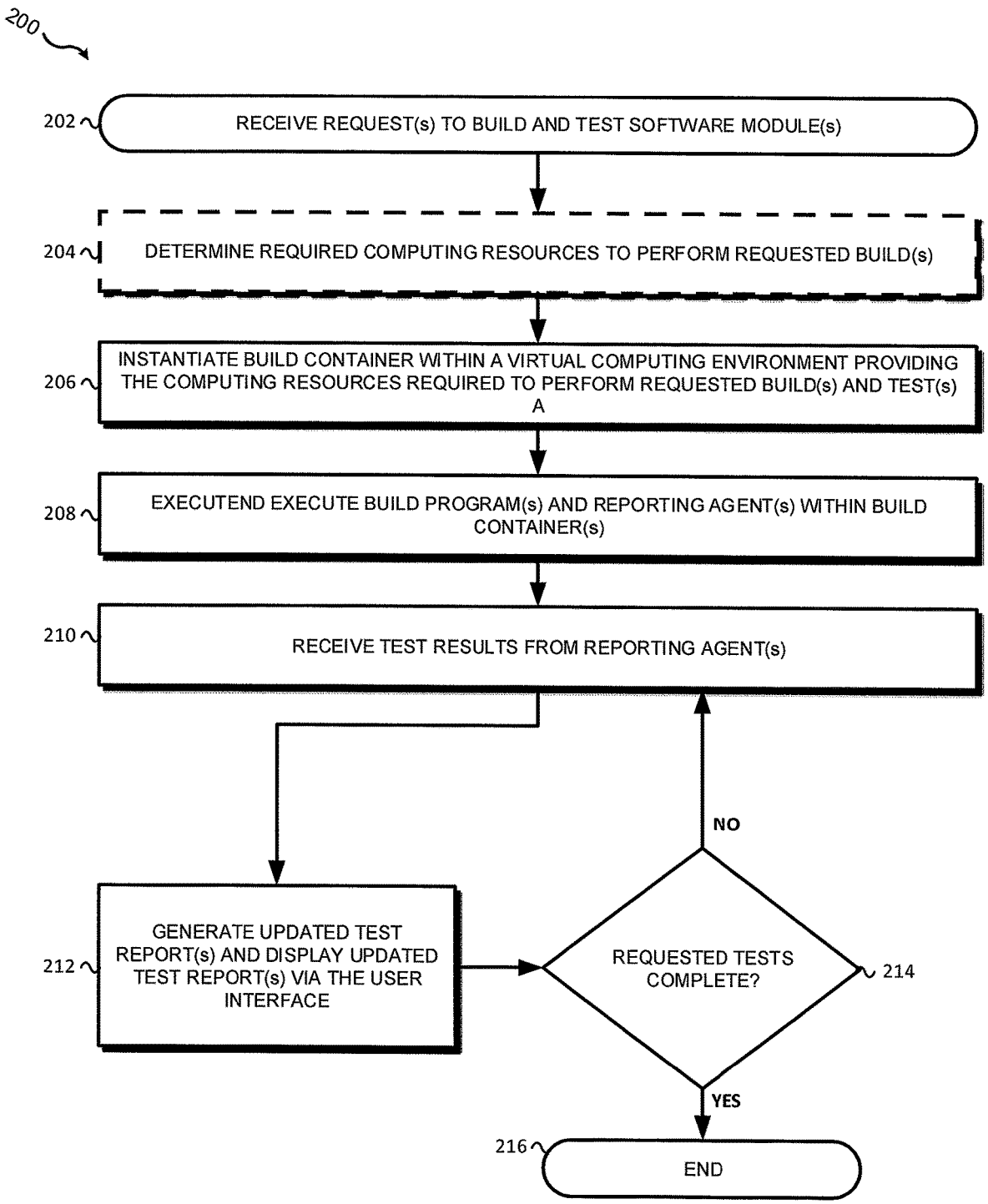
FIG. 2 is flowchart illustrating an example procedure performed in embodiments disclosed herein.

FIG. 2 illustrates an example procedure 200 performed a computing system, such as the computing environment 100 of the computing resource service provide 199, as described above which may instantiate a build service (e.g., the build service 120). At step 202 the system receives a request (e.g., the request 105) to build and test a software module. For example, in some embodiments, a user (e.g., the user 102) may submit the request to execute a build via a user interface (e.g., the user interface 108) provided by system (e.g., the computing environment 100 of the computing resource service provider 199), and a frontend provided by the system may deliver the request to the build service, as described herein. Additionally or alternatively, a triggering event may cause a notification to be generated and delivered to the build service. For example, the user may commit a source code update to a software project that is stored with building and testing functions enabled; the request may include an API call that, along with storing the new/revised source code, also triggers a build and test of the source code. In some embodiments, the request may identify a container image stored in a datastore (e.g., one of the datastores 130, 130(2)). The container image may include program code (e.g., the program code 110). In some embodiments, the request may include a location of program code (e.g., program code 110) in a datastore (e.g., one of the datastores 130, 130(2)) and the build service may then retrieve the program code and install it within the build container. In some embodiments, the build service may receive multiple build requests and may process them as described previously in connection to FIGS. 1A and 1B above sequentially or concurrently.

At step 204, the system optionally determines required computing resources to perform the requested build(s) and the accompanying test run(s). In some embodiments, the system may extract or otherwise determine information describing the requested build from the request. For example, the request may identify the project or source code to be built, as well as the build program to use to perform the build. The system may use the identification of the build program to select a container image. At step 206, the system instantiates a build container (such as a build container 150) within a virtual computing environment (such as a virtual computing environment 140) providing the required computing resources. In some embodiments a build service communicates with a resource allocation service to obtain an allocation of physical computing resources in which a build container (e.g., one the build containers 150) having the identified image can be launched. In some embodiments the system determines that an instance of a build container suitable for the build has already been launched and is idle.

At step 208, the system executes build programs and reporting agent(s) (such as the build program(s) 151 and reporting agent 152) within the build container(s). At step 210, system (using a reporting engine such as the reporting engine 122 for example) receives test results (such as the test results 160) from the reporting agent(s). In some embodiments, the test results may be output files generated by an automated software testing framework at one or more locations within a filesystem of the build container. In some embodiments, the test results may include error or messages or other messages written to a system log or virtual console of the build container during execution of various tests. At step 212, the system generates an updated test report reflecting the current test results. The system may also update a user interface display which provides the updated test report to the user. At step 214, the system determines whether the requested tests of the test run have all been completed. If so, the procedure 200 terminates at step 216. Otherwise the procedure 200 returns to step 210 and receives additional test results 160 and proceeds again to step 212. The procedure 200 continues until the test run is completed.

Figure 3:
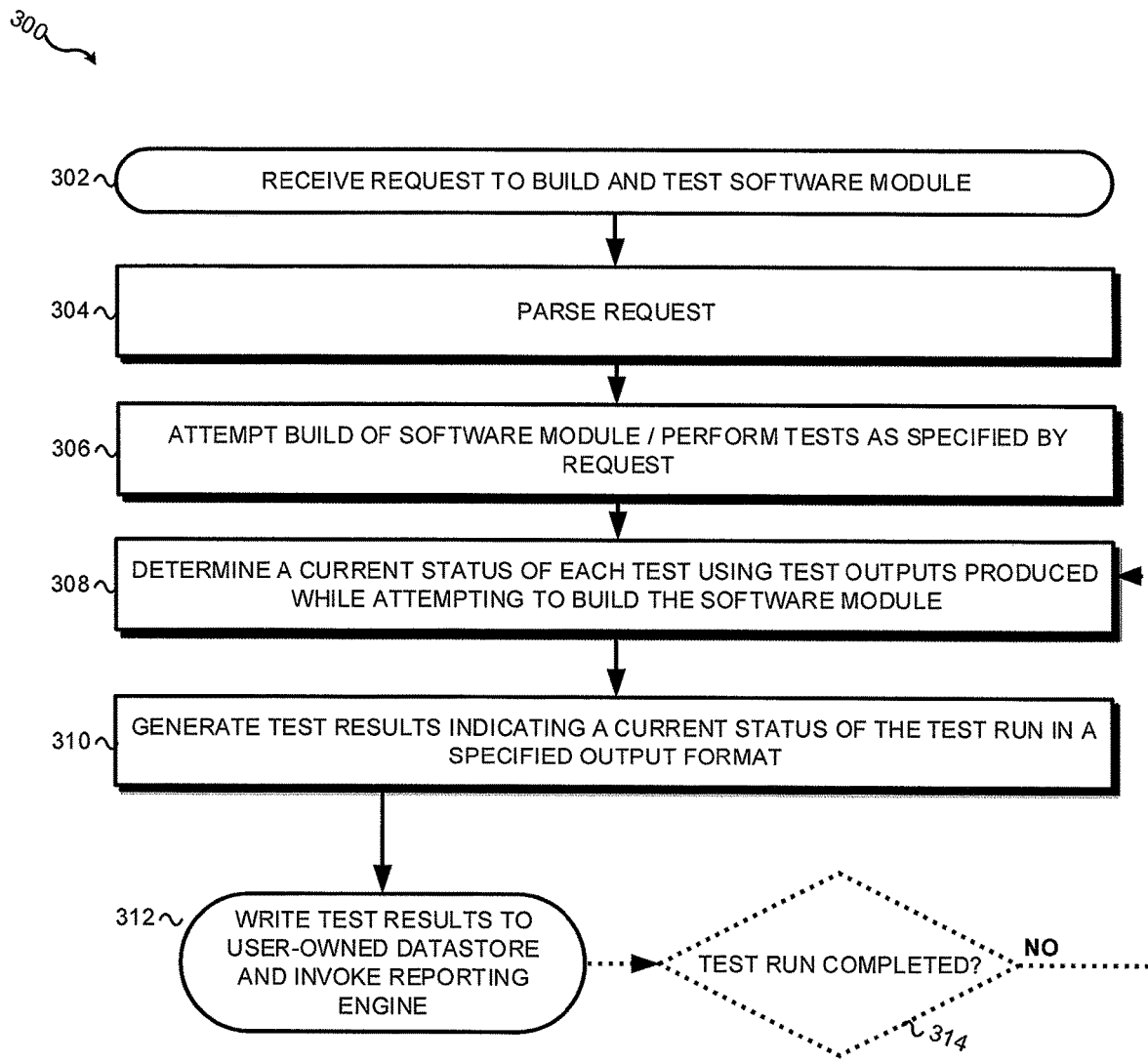
FIG. 3 is flowchart illustrating another example procedure performed in embodiments disclosed herein.

FIG. 3 is a flowchart illustrating an example procedure 300 which may be performed by a system during step 208 of the example procedure 200 in certain embodiments. At step 302 the system receives a request to build and test a software module. At step 304 the system parses the request (e.g., using a parser such as the parser 153 of the reporting agent 152) to determine, as a non-limiting example, where the test outputs will be located within a filesystem of the build container. The test outputs may be formatted according to a common format such as YAML or JSON, as described above. The request may provide the system with an expected input format of the test. At step 306, the system attempts to build the software module and perform a test run comprising individual tests, each of which produce test outputs at locations in the build container which may be specified in the request or within the build container itself. At step 308, the system (e.g., using an analyzer such as the analyzer 154 of the reporting agent 152) obtains the test outputs, which are provided in the expected input file format, and extracts relevant information concerning the outcome of each test using the expected file format of the test outputs. In some embodiments, the test results may include information identifying the input file format. In such embodiments, the analyzer may assorted input file formats and determine the appropriate format to use to extract information from portions of test results.

At step 310, the system outputs test results indicating the current status of the test run using the information extracted from the test outputs. The test results are generated in an output format specified (e.g., by a reporting agent such as the reporting agent 152 using the formatter 155). The output format may be supplied by the computing resource service provider or supplied to the system by the user. At step 312 system stores the test results, which collectively indicate the current status of the test run in the specified output format. The test results may be written to a file or database which may be stored in a user-owned datastore (e.g., the datastore 130). The user may utilize access permissions (e.g., access permissions 132) to control whether additional users associated with the user may access the datastore. The datastore may be provided by the system, which may also enforce the access permissions. The system then generates a requested test report using the test results (e.g., by a reporting agent such as the reporting agent 152 invoking the reporting engine 122 of the build service 120).

In some embodiments, the procedure 300 may proceed to step 314. At step 314 system determines whether the test run has been completed. If not, the procedure 300 may return to step 308 and either periodically check for new test outputs or receive a notification that new test outputs are available. Embodiments including performing step 314 may allow the system to provide real-time or near real-time updates of the test report to the user via the user interface during execution of a test run.

Figure 4:
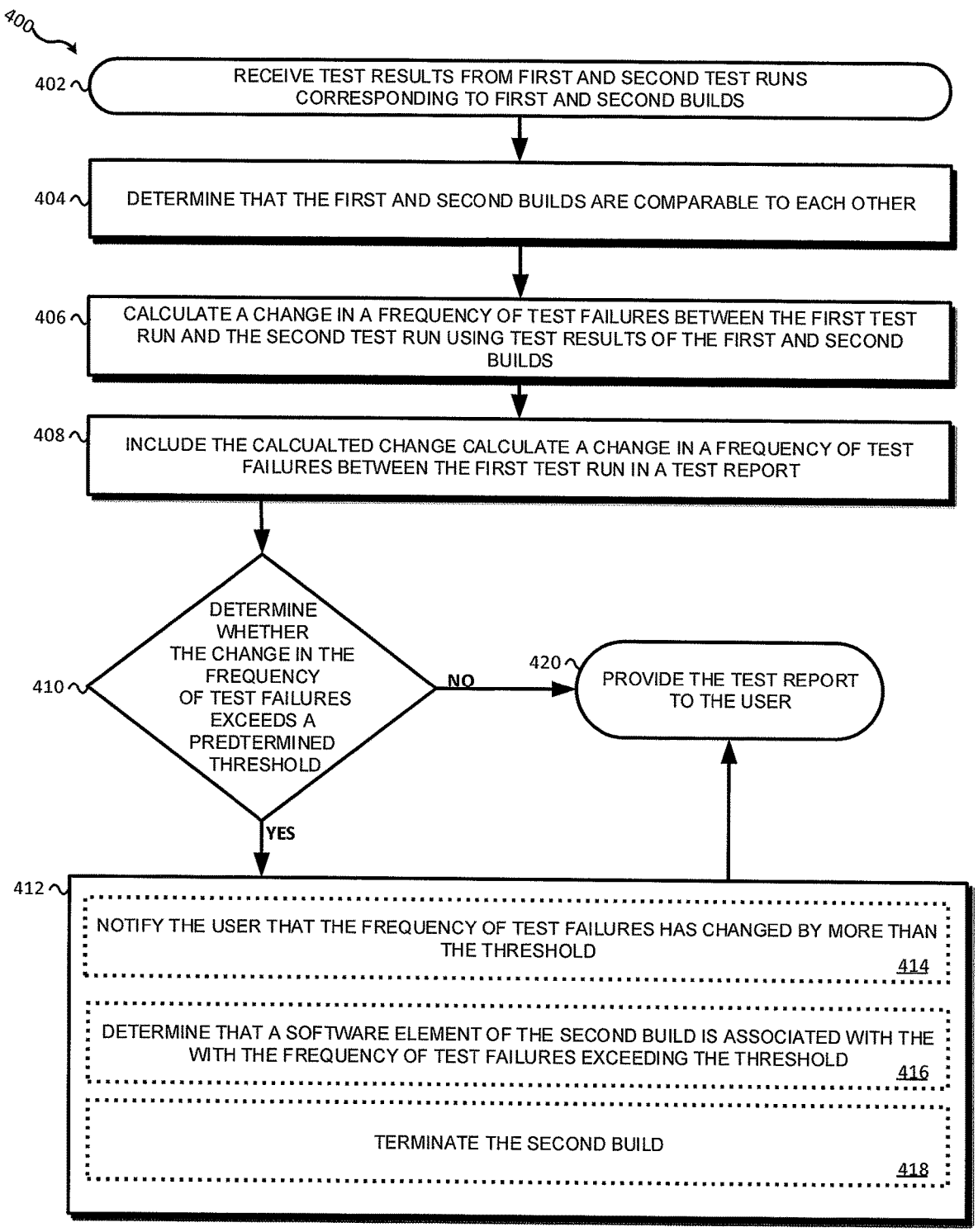
FIG. 4 is flowchart illustrating another example procedure performed in embodiments disclosed herein.

FIG. 4 shows an example procedure 400 performed by a system in certain embodiments. Step 412 may include any of the optional sub-steps 414, 416, and 418. At step 402, the system receives test results from first and second test runs corresponding to first and second builds, (which may be performed by reporting agents 152 as described previously above, for example). The first test run may already be completed at the time of the second test run. At step 406, system calculates a change in the frequency of occurrence of test failures between the first and second test runs using the first and second test results. At step 408, system includes the change in the frequency of test failures in the test report. At Step 410, the system determines whether the change in the frequency of test failures exceeds a predetermined threshold. In some embodiments, the threshold is provided by the user.

If the threshold has not been exceeded, the procedure 400 proceeds to step 420 and concludes with providing the test report to the user. However, if the threshold has been exceeded, the procedure proceeds to step 412 where the system may perform one or more additional actions which may be specified by the user, before proceeding to step 420. Optional steps 414, 416, and 418 are examples of such additional actions. At step 414, the system may notify the user that the frequency of test failures has changed by more than the threshold. This notification may be accomplished within the test report or by a notification provided in any other acceptable manner such as an e-mail, a push notification to a mobile or other computing device, an alert provided in the user interface, and so on. At step 416 system may determine that a software element of the second build is associated with the frequency of test failures exceeding the threshold. This determination may also be provided in the test report or via other means as disclosed above. At step 418, the system may terminate the second build.

Figure 5:
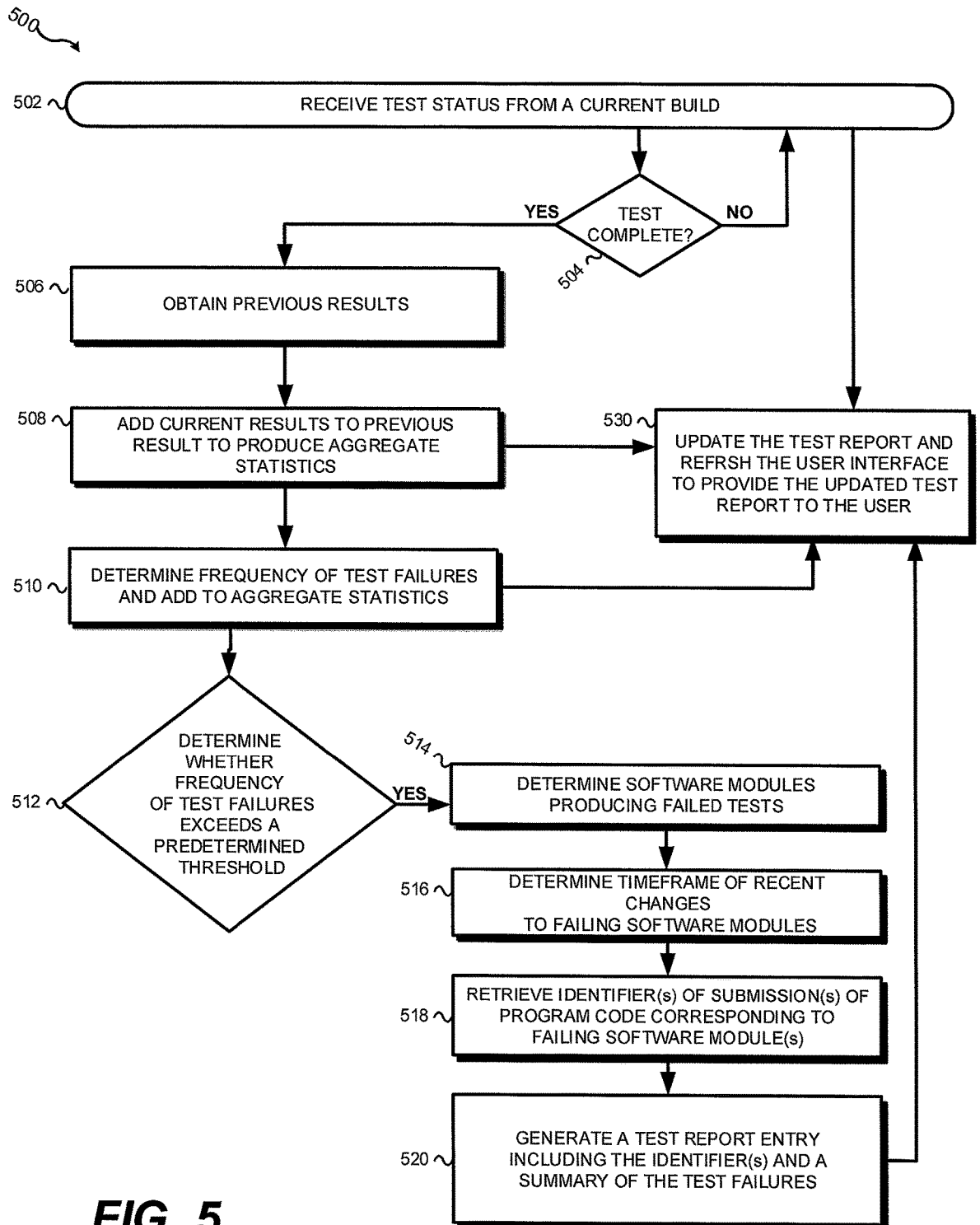
FIG. 5 is flowchart illustrating another example procedure performed in embodiments disclosed herein.

FIG. 5 shows an example procedure 500 performed by a system (e.g., the computing environment 100 of the computing resource service provide 199) in certain embodiments. The steps of procedure 500 may be performed by build service 120 using the reporting agent 122, for example. At step 502 the system receives a test status from a current build and proceeds to step 530 where the system updates the test report and refreshes the user interface to provide the user with an updated display or other form of the updated test report. The system also proceeds to step 504 to and determines whether the test is complete. If not, the system waits to receive an updated status. If the test is complete, the system proceeds to step 506 and obtains previous results and proceeds to step 508 where the current results are aggregated with the previous results. The system proceeds from step 508 to step 530 and updates the test report with the aggregated statistics as previously described and also proceeds to step 510. At step 510, the system determines the frequency of test failures and adds this rate of test failures to the aggregate statistics and proceeds again to step 530 to update the test report with the rate of test failures. The system also proceeds to step 512. At step 512, the system may determine whether the frequency of test failures exceeds a predetermined threshold which may be provided by a user and proceeds to step 514 if so. At step 514 the system determines which software module(s) are producing failed tests and proceeds to step 516. For example, if test failures associated with a particular module are sufficiently numerous to exceed the threshold alone, the system may attribute the increased frequency of failures with that module.

At step 516, the system may determine a timeframe of recent changes to the failing software module(s) and proceeds to step 518. At step 518 the system retrieves identifier(s) of submission(s) of program code corresponding to failing software module(s) and proceeds to step 520. At step 520 the system generates a test report entry in the test report including the identifier(s) and a summary of the test failures and proceeds to step 530 where the test report is again updated and the user interface is again refreshed.

Figure 6:
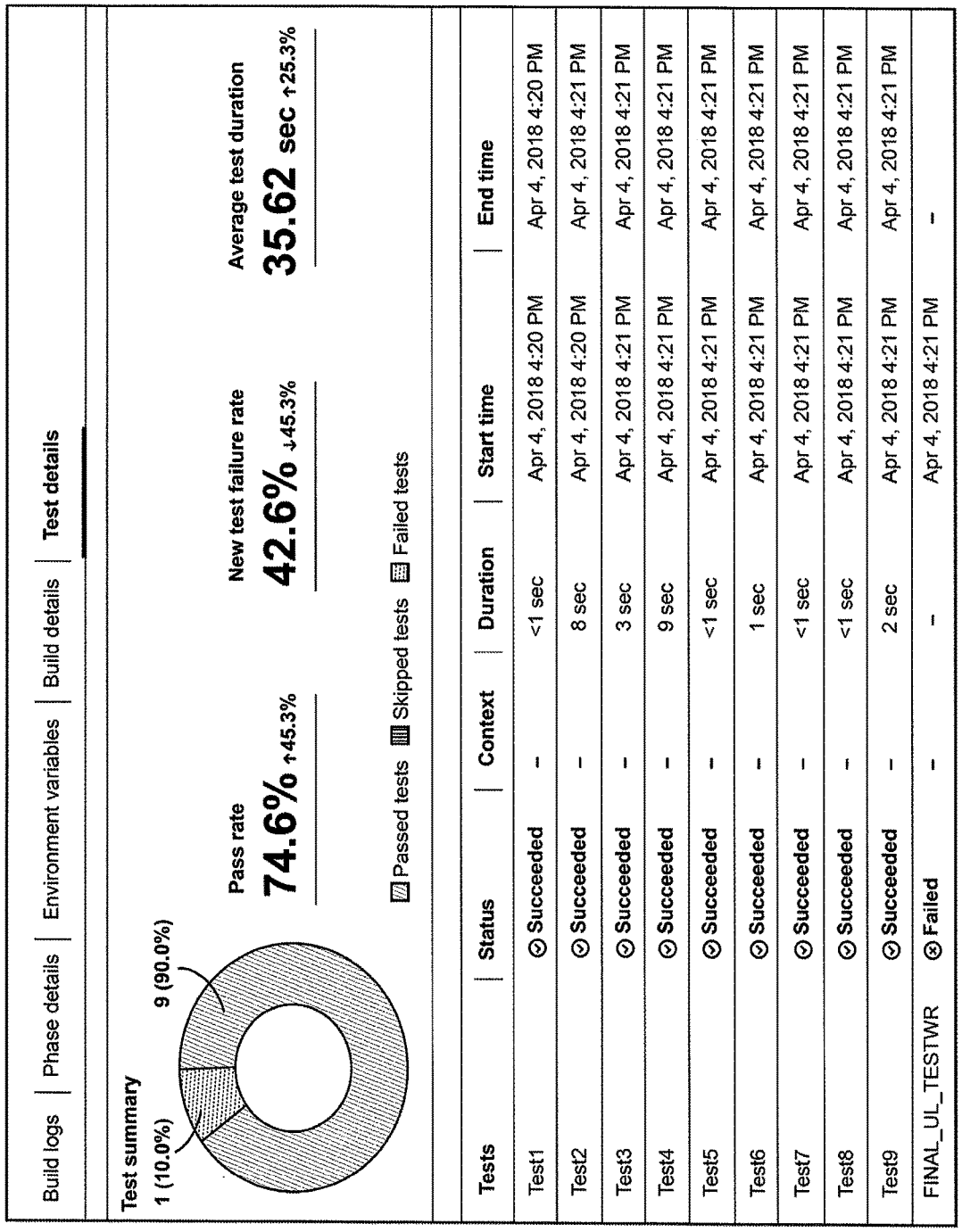
FIG. 6 is an example user interface display of a test report generated using embodiments disclosed herein.

FIG. 6 shows an example test report 670. The test report 670 includes a summary of the overall status of the corresponding test run showing that nine individual tests of the test run were passed while one test was failed. The test report 670 also shows an average execution time of 35.62 seconds. The test report 670 also includes information that summarizes trends in various metrics. For example, the most recent pass rate was better than the historical average. However, the average test duration (execution time) increased as well. The test report 670 also displays the outcomes of individual tests making up the test run and additional information such as start and end times and duration of the test.

Figure 7:
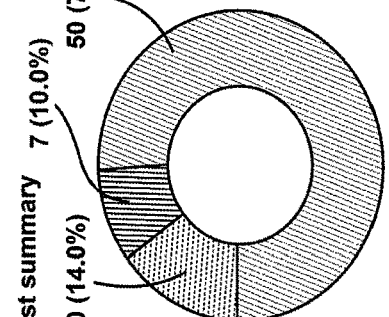
FIG. 7 is another example user interface display of a test report generated using embodiments disclosed herein.

FIG. 7 shows an alternative test report 770 generated in response to a request to show all instances of a particular test having a test identifier "UI_TEST1" and the corresponding outcome indicators (e.g., "Failed" or "Succeeded") along a with a test run identifier, and a software project associated with that test run. Occurrences of passed and failed tests are also represented chronologically in the "Successful vs failed test trends" plot at the upper right of the test report 770. In some embodiments, the user 102 may define custom outcome indicators in addition to defaults like "passed," "failed," "succeeded," et al. As a non-limiting example, the user 102 may provide rules for one or more tests having numerical test outputs 160 to produce outcome indicators such as "out of range," "within range", "high", "low", etc.

Figure 8:
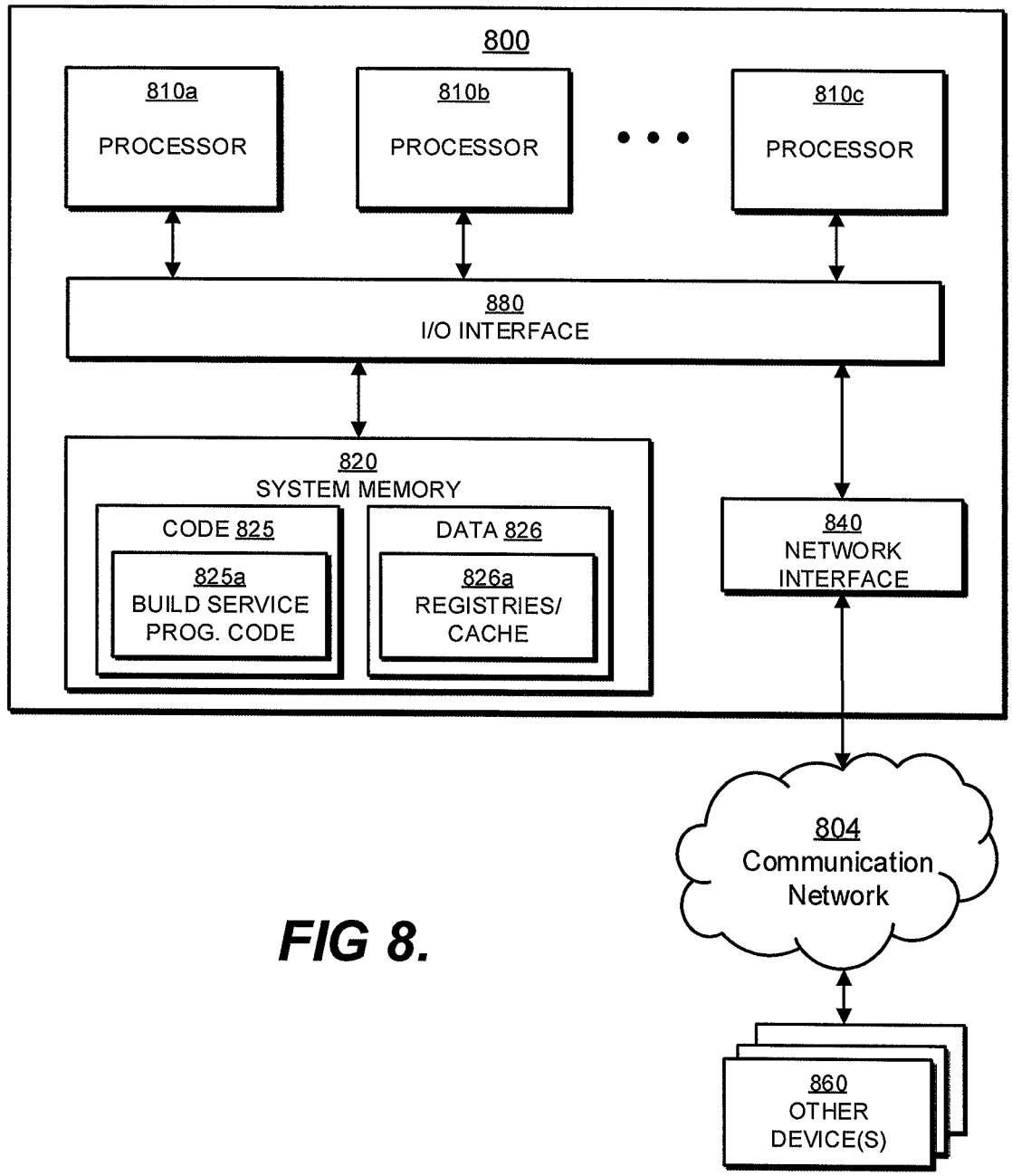
FIG. 8 is a diagram of a computing environment including an example computing device specially configured to implement the presently described systems and methods.

In at least some embodiments, a computing device that implements a portion or all of one or more of the technologies described herein, including, but not limited to, the techniques to implement the functionality of the build service 120, can include one or more computer systems that include or are configured to access one or more computer-accessible media. FIG. 8 illustrates such a computing device 800. In the illustrated embodiment, computing device 800 includes one or more processors 810a, 810b, . . . , 810n (which may be referred herein singularly as "a processor 810" or in the plural as "the processors 810") coupled to a system memory 820 via an input/output (I/O) interface 880. Computing device 800 further includes a network interface 840 coupled to I/O interface 880.

In various embodiments, computing device 800 may be a uniprocessor system including one processor 810 or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, Power PC, SPARC, or MIPS ISAs, or any other suitable ISA. In multiprocessor systems, each of processors 810 may commonly, but not necessarily, implement the same ISA.

System memory 820 may be configured to store instructions and data accessible by processor(s) 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods techniques, and data described above, are shown stored within system memory 820 as code 825 and data 826. The code 825 may particularly include build service program code 825a and/or other types of machine-readable instructions executable by one, some, or all of the processors 810a-n to implement the build service 120; similarly, the data 826 may particularly include data 826a such as registries, cache layers, configuration information, and so on.

In one embodiment, I/O interface 880 may be configured to coordinate I/O traffic between processor(s) 810a-n, system memory 820, and any peripheral devices in the device, including network interface 840 or other peripheral interfaces. In some embodiments, I/O interface 880 may perform any necessary protocol, timing, or other data transformations to convert data signals from one component (e.g., system memory 820) into a format suitable for use by another component (e.g., processor(s) 810a-n). In some embodiments, I/O interface 880 may include support for devices attached through various types of peripheral buses, such as a variant of the Peripheral Component Interconnect (PCI) bus standard or the Universal Serial Bus (USB) standard, for example. In some embodiments, the function of I/O interface 880 may be split into two or more separate components, such as a north bridge and a south bridge, for example. Also, in some embodiments some or all of the functionality of I/O interface 880, such as an interface to system memory 820, may be incorporated directly into processor 810.

Network interface 840 may be configured to allow data to be exchanged between computing device 800 and other device or devices 860 attached to a network or network(s) 850, such as user computing devices and other computer systems described above, for example. In various embodiments, network interface 840 may support communication via any suitable wired or wireless general data networks, such as types of Ethernet networks, for example. Additionally, network interface 840 may support communication via telecommunications/telephony networks, such as analog voice networks or digital fiber communications networks, via storage area networks, such as Fiber Channel SANs or via any other suitable type of network and/or protocol.

In some embodiments, system memory 820 may be one embodiment of a computer-accessible medium configured to store program instructions and data for implementing embodiments of the present methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 800 via I/O interface 880. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840. Portions or all of multiple computing devices, may be used to implement the described functionality in various embodiments; for example, software components running on a variety of different devices and servers may collaborate to provide the functionality. In some embodiments, portions of the described functionality may be implemented using storage devices, network devices, or special purpose computer systems, in addition to or instead of being implemented using general-purpose computer systems. The term "computing device," as used herein, refers to at least all these types of devices and is not limited to these types of devices.

A network set up by an entity, such as a company or a public sector organization, to provide one or more services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and services offered by the provider network. The resources may in some embodiments be offered to clients in units called instances, such as virtual or physical computing instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general purpose or special purpose operating systems, platforms that support various interpreted or compiled programming languages, such as Ruby, Perl, Python, C, C++, and the like, or high performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems (OS) and/or hypervisors and with various installed software applications, runtimes, and the like. Instances may further be available in specific availability zones, representing a data center or other geographic location of the underlying computing hardware, as further described by example below.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

The provider network may make instances available "on-demand," allowing a customer to select a number of instances of a specific type and configuration (e.g. size, platform, tenancy, availability zone, and the like) and quickly launch the instances for deployment. On-demand instances may further be added or removed as needed, either manually or automatically through auto scaling, as demand for or capacity requirements change over time. The customer may incur ongoing usage costs related to their on-demand instances, based on the number of hours of operation and/or the actual resources utilized, for example.

The computing resource provider may also make reserved instances available to the customer. Reserved instances may provide the customer with the ability to reserve a number of a specific type and configuration of instances for a fixed term, such as one year or three years, for a low, up-front cost in exchange for reduced hourly or other usage costs, for example, if and when the instances are launched. This may allow the customer to defer costs related to scaling up the deployed application in response to increase in demand, while ensuring that the right resources will be available when needed. While reserved instances provide customers with reliable, stand-by capacity for scaling of their application, purchasing reserved instances may also lock the customer into a specific number, type, and/or configuration of computing resource in a specific availability zone for a longer period than desired. If the technical architecture or needs of the application change, the customer may not be able to realize a return on the customer's investment in the reserved instances.

Operators of such provider networks may in some instances implement a flexible set of resource reservation, control, and access interfaces for their clients. For example, a resource manager of the provider network may implement a programmatic resource reservation interface (e.g., via a web site or a set of web pages) that allows clients to learn about, select, purchase access to and/or reserve resource instances. In some embodiments discussed below where an entity, such as a resource manager or a pricing optimizer, is described as implementing one or more programmatic interfaces, such as a web page or an API, an interface manager subcomponent of that entity may be responsible for the interface-related functionality. In many embodiments equivalent interface-related functionality may be implemented by a separate or standalone interface manager, external to the resource manager. Such an interface may include capabilities to allow browsing of a resource catalog and details and specifications of the different types or sizes of resources supported and the different reservation types or modes supported, pricing models, and so on.

In accordance with the above description, the present disclosure provides, in an example embodiment, a system comprising one or more processors and memory storing computer-executable instructions. The instructions when executed by the one or more processors, cause the system to receive a first request to generate, from first program code of a user, a first build of a first software module executable within a virtual computing environment of a computing resource provider. The first request associates tests to be performed during generation of the first build in order to validate the first build with a first test run identifier. The instructions also cause the system to configure a first container instance allocated within the virtual computing environment to provide a build environment for the first build, the build environment including a first reporting agent and execute the first reporting agent within the first container instance.

Executing the instructions also causes the system to receive the first program code; attempt to generate, in the first container instance from the first program code, the first build; while generating the first build, perform the tests associated with the first test run identifier to produce first test outputs; provide the first test outputs to the first reporting agent as the test outputs, the first reporting agent producing first test results from the first test outputs; and determine that the first test results have been stored in the datastore. Executing the instructions also causes the system to retrieve the first test results and provide a test report including the first test results to the user via a user interface.

Executing the first reporting agent causes the first reporting agent to receive test outputs, and, responsive to receiving the test outputs: convert the test outputs using a previously-specified format and the first request to produce test results; and store the test results in a datastore associated with the user. Each test output is produced from execution of a corresponding one of the tests associated with the first test run identifier and the test outputs include a current status of each corresponding test.

In some such embodiments, the instructions, when executed by the one or more processors, further cause the system to receive a second request to generate, from second program code of the user, a second build of a second software module associated with the first software module. The second request associates tests to be performed during generation of the second build in order to validate the second build with the first test run identifier. Executing the instructions may also cause the system to configure a second container instance allocated within the virtual computing environment to provide a second build environment for the second build and execute the first reporting agent within the second container instance. The second build environment includes the first reporting agent. Executing the instructions may also cause the system to receive the second program code; attempt to generate, in the second container instance from the second program code, the second build; while generating the second build, perform each of the tests associated with the first test run identifier to produce second test outputs; provide the second test outputs to the first reporting agent as the test outputs, the first reporting agent producing second test results from the second test outputs; determine that the second test results have been stored in the datastore; retrieve the second test results; and provide the test report to the user via the user interface, the test report including the second test results with the first test results.

Executing the instructions may further cause the system to determine respective numbers of tests performed during the first and second builds, and respective numbers of test failures occurring during the first and second builds; calculate a change in a frequency of test failures between the first build and the second build; include the calculated change in the frequency of test failures in the test report; determine that the calculated change in the frequency of test failures exceeds a threshold specified by the user; and perform at least one of the following actions: providing a notification to the user that the calculated change in the frequency of test failures exceeds the threshold specified by the user; terminating generation of the second build; and determining that an element of the second software module is associated with the calculated change in the frequency of test failures exceeding the threshold.

Executing the instructions may further cause the system to receive, from the user of the computing resource service provider via the user interface, a request to generate, from the first and second program codes, a software project build of a software project executable within a virtual computing environment of the computing resource provider, the software project including the first and second software modules; and determine, that an instance of the software project build may be generated and validated by concurrently generating and validating instances of the first and second builds. Executing the instructions may further cause the system to output the first and second test results, and cause the first and second reporting agents to execute concurrently within the virtual computing environment.

In another example embodiment, a system comprises one or more processors and memory storing computer-executable instructions. The instructions when executed by the one or more processors, cause the system to deploy, into each of one or more build containers executing in a virtual computing environment of a computing resource service provider, a corresponding instance of a reporting agent; execute, during generation of a build of a corresponding instance of a software module from associated program code, a corresponding test run during each attempted build of the software module in one of the one or more build containers and the corresponding instance of the reporting agent obtaining information describing each of the plurality of tests as the test output; and generate and store one or more test reports each comprising information describing one or more of the test results stored in the datastore.

During a build of a software module from associated program code, the instance of the reporting agent may be configured to automatically: obtain test output produced by executing a test to validate the build; transform the test output into a test result having a predetermined format; and store the test result in a datastore. The corresponding test run may include a plurality of tests performed on the build of the corresponding instance of the software module.

In some such embodiments, executing the instructions may further cause the system to associate each test result with a respective test run identifier provided by the user; retrieve test results where the test run identifier indicates that the test results were generated by comparable test runs; and provide a test report to the user that summarizes a trend in the one or more metrics for the retrieved test results as of function of time or another variable selected by the user.

Executing the instructions may further cause the system to determine, by analyzing the retrieved test results, that the trend in the one or more metrics is attributable to a particular software module included in the software project. Executing the instructions may further cause the system to determine, by analyzing the retrieved test results, that the trend in the one or more metrics attributable to the particular software is attributed to a change in program code of particular software module identified by at least one of: a particular time after a first test run and before a second test run; and an identifier indicating a particular version of the program code of the particular software module.

Executing the instructions may further cause the system to measure an amount of computing resources utilized during each test run; include the measured amount of computing resources utilized during each test run in the test result for that test run; receive a request to execute a new test run having a test run identifier indicating similar previous test runs and retrieve the test results of the similar previous test runs; determine, by analyzing the retrieved test results, that a trend exists in the measured amount of computing resources utilized during the similar previous test runs; predict an amount of computing resources required to execute the new test run based on the determined trend in the measured amount of computing resources utilized during the similar previous test runs; and increase a resource allocation of virtual computing environment to provide the predicted amount of computing resources required to execute the new test run.

In some such embodiments, executing the instructions may further cause the system to associate each test result with a respective test run identifier provided by the user; receive a request from the user to compare a selected test run that generated selected test results to comparable test runs; retrieve comparable test results that the identifier indicates were generated by comparable test runs to the selected test run; calculate representative statistics of the comparable test runs using the summary information of the comparable test results; and provide a comparison report to the user that expresses the summary information of the selected test result relative to the representative statistics of the of the comparable test runs.

Executing the instructions may further cause the system to receive failure criteria for determining that a test run has failed; receive a request from user to receive a report of failed test runs; include, in the requested report of failed test runs, corresponding test run identifiers of the failed test runs and references to locations of log data corresponding to the failed test runs; and provide the requested report of failed test runs to the user via the user interface such that the user may interact with user interface elements displayed with the requested report to access test reports corresponding to the failed test runs and the log data corresponding to the failed test runs.

In some such embodiments, executing the instructions further causes the system to receive permission information from the user, the permission data including authorized users and access categories associated with each of the authorized users; receive a request to access a requested test report from a requesting user who is one of the authorized users; determine that the requesting user is not permitted to access the requested test report using the access categories associating with the requesting user and at least one of an identifier of the requested test report and a project associated with the requested test report; and prevent the requesting user from accessing the requested test report.

In some such embodiments, executing the instructions further causes the system to generate summary information for each of the test results, the summary information including at least one of: a time required to compile program code of the corresponding software module to generate the correspond instance of the software project; a time required to obtain the test results; a number of errors encountering during compilation of the program code of the corresponding software project; and a number of failed tests encountered while attempting to the build the corresponding instance of the software project.

In another example embodiment, a system comprises one or more processors and memory storing computer-executable instructions. The instructions, when executed by the one or more processors, cause the system to receive test outcome definitions, each test outcome definition providing rules for assigning an outcome indicator belonging to a predetermined set of outcome indicators to each of a set of possible outputs of a software testing framework executable within a virtual computing environment of the computing resource provider. Executing the instructions further causes the system to receive test results from respective reporting agents executing in the virtual computing environment within respective build containers; and provide the individual outcome indicators to a user as part of a test report provided by a user interface of the computing resources service provider. During execution of each reporting agent, that reporting agent is configured to: attempt to build a corresponding instance of a software project including software modules; while attempting to build the corresponding instance of the software project, execute a test run including a plurality of tests according to a request received from a user, thereby producing test outputs for each test included in the test run, the test outputs being produced by the software testing framework; and generate and store the test result for the corresponding instance of the software project including individual test outcomes represented by an outcome indicator from the predetermined set of outcome indicators assigned to each test output according to the test outcome definitions.

In some such embodiments executing the instructions further causes the system to receive the test outcome definitions from the user of the interface of the computing resources service provider via the user interface; determine that the test outcome definitions omit rules for assigning an outcome indicator belonging to the predetermined set of outcome indicators to a particular possible output of the software testing framework; and augment the test outcome definitions with a default rule for assigning an outcome indicator belonging to the predetermined set of outcome indicators to the particular possible output of the software testing framework.

Executing the instructions may cause the system to perform a user-defined action in response to one or more of the following: determining that the test run has failed; determining that the test report includes a particular outcome indicator; and determining that a time required to execute the test run exceeded a predetermined threshold. Executing the instructions may cause the system to perform at least one of the following as the user-defined action: providing a user-defined notification to the user; terminating the attempt to build the corresponding instance of the software project; and altering a build parameter and attempt to build attempt to build the corresponding instance of the software project with the altered build parameter.

In some such embodiments executing the instructions further causes the system to receive an input format definition specifying an expected format of the test outputs; receive an output format definition specifying a desired test result format; extract information from portions of each test output identified by the input format definition; and provide the extracted information in the test results according to the output format definition. Executing the instructions further causes the system to receive a user-defined test output format from the user as the input format definition.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UPnP"), Network ("NFS"), Common Internet ("CIF S") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of datastores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising one or more processors and memory storing computer-executable instructions that, when executed by the one or more processors, cause the system to:
   receive a first request to generate, from first program code of a user, a first build of a first software module executable within a virtual computing environment of a computing resource provider, the first request associating tests to be performed during generation of the first build in order to validate the first build with a first test run identifier;
   configure a first container instance allocated within the virtual computing environment to provide a first build environment for the first build, the first build environment including a first reporting agent;
   execute the first reporting agent within the first container instance, said execution of the first reporting agent causing the first reporting agent to:
      receive test outputs, each test output produced from execution of a corresponding one of the tests associated with the first test run identifier, the test outputs including a current status of each corresponding test; and
      responsive to receiving the test outputs:
         convert the test outputs using a previously-specified format and the first request to produce test results; and
         store the test results in a datastore associated with the user;
   receive the first program code;
   attempt to generate, in the first container instance from the first program code, the first build;
   while generating the first build, perform the tests associated with the first test run identifier in the first container instance to produce first test outputs;
   receive a second request to generate, from second program code of the user, a second build of a second software module associated with the first software module, the second request associating tests to be performed during generation of the second build in order to validate the second build with the first test run identifier;
   configure a second container instance allocated within the virtual computing environment to provide a second build environment for the second build, the second build environment including the first reporting agent;
   execute the first reporting agent within the second container instance, said execution of the first reporting agent causing the first reporting agent to:
      receive test outputs, each test output produced from execution of a corresponding one of the tests associated with the first test run identifier, the test outputs including a current status of each corresponding test; and
      responsive to receiving the test outputs:
         convert the test outputs using the previously-specified format and the first request to produce test results; and
         store the test results in the datastore associated with the user;
   receive the second program code;
   attempt to generate, in the second container instance from the second program code, the second build;
   while generating the second build, perform the tests associated with the first test run identifier in the second container instance to produce second test outputs;
   provide the first test outputs to the first reporting agent in the first container instance as the test outputs, the first reporting agent producing first test results from the first test outputs;
   provide the second test outputs to the first reporting agent in the second container instance as the test outputs, the first reporting agent producing second test results from the second test outputs and determine that the first test results and the second test results have been stored in the datastore;
retrieve the first test results and the second test results; and
provide a test report including the first test results and the second test results to the user via a user interface.

2. The system of claim 1, wherein the instructions, when executed by the one or more processors, further cause the system to:
determine:
respective numbers of tests performed during the first and second builds; and
respective numbers of test failures occurring during the first and second builds;
calculate a change in a frequency of test failures between the first build and the second build;
include the calculated change in the frequency of test failures in the test report;
determine that the calculated change in the frequency of test failures exceeds a threshold specified by the user; and
perform at least one of the following actions:
providing a notification to the user that the calculated change in the frequency of test failures exceeds the threshold specified by the user;
terminating generation of the second build; and
determining that an element of the second software module is associated with the calculated change in the frequency of test failures exceeding the threshold.

3. The system of claim 1, wherein the memory stores further computer-executable instructions that, when executed by the one or more processors, cause the system to:
receive, from the user of the computing resource service provider via the user interface, a request to generate, from the first and second program codes, a software project build of a software project executable within a virtual computing environment of the computing resource provider, the software project including the first and second software modules; and
determine, that an instance of the software project build may be generated and validated by concurrently generating and validating instances of the first and second builds;
output the first and second test results; and
cause the first and second reporting agents to execute concurrently within the virtual computing environment.

4. A system comprising one or more processors and memory storing computer-executable instructions that, when executed by the one or more processors, cause the system to:
deploy, into each of one or more build containers executing in a virtual computing environment of a computing resource service provider, a corresponding instance of a reporting agent configured to automatically, during a build of a software module from associated program code:
obtain test output produced by executing a test to validate the build; transform the test output into a test result including a predetermined format; and store the test result in a datastore;
during generation of a build of a corresponding instance of a software module from associated program code, execute:
a corresponding test run during each attempted build of the software module in one of the one or more build containers, the corresponding test run including a plurality of tests performed on the build of the corresponding instance of the software module; and
the corresponding instance of the reporting agent obtaining information describing each of the plurality of tests as the test output;
generate and store one or more test reports each comprising information describing one or more of the test results stored in the datastore;
predict an amount of computing resources required to execute a new test run based on a determined trend in a measured amount of computing resources used during comparable test runs;
increase a resource allocation within a virtual computing environment to provide the predicted amount of computing resources required to execute the new test run;
associate the test results with respective test run identifiers provided by a user;
retrieve test results where the test run identifier indicates that the test results were generated by comparable test runs; and
provide a test report to the user that summarizes a trend in one or more metrics for the retrieved test results as a function of time or another variable selected by the user.

5. The system of claim 4, wherein the memory stores further computer-executable instructions that, when executed by the one or more processors, cause the system to determine, by analyzing the retrieved test results, that the trend in the one or more metrics is attributable to a particular software module included in the software project.

6. The system of claim 5 wherein the memory stores further computer-executable instructions that, when executed by the one or more processors, cause the system to determine, by analyzing the retrieved test results, that the trend in the one or more metrics attributable to the particular software is attributed to a change in program code of particular software module identified by at least one of:
a particular time after a first test run and before a second test run; and
an identifier indicating a particular version of the program code of the particular software module.

7. The system of claim 4 wherein the memory stores further computer-executable instructions that, when executed by the one or more processors, cause the system to:
receive a request from the user to compare a selected test run that generated selected test results to comparable test runs;
retrieve comparable test results that the identifier indicates were generated by comparable test runs to the selected test run;
calculate representative statistics of the comparable test runs using summary information of the comparable test results; and
provide a comparison report to the user that expresses the summary information of the selected test run relative to the representative statistics of the of the comparable test runs.

8. The system of claim 4 wherein the memory stores further computer-executable instructions that, when executed by the one or more processors, cause the system to:
receive failure criteria for determining that a test run has failed;
receive a request from user to receive a report of failed test runs;

include, in the report of failed test runs, corresponding test run identifiers of the failed test runs and references to locations of log data corresponding to the failed test runs; and provide the report of failed test runs to the user via the user interface such that the user may interact with user interface elements displayed with the report of failed test runs to access test reports corresponding to the failed test runs and the log data corresponding to the failed test runs.

9. The system of claim 4 wherein the memory stores further computer-executable instructions that, when executed by the one or more processors, cause the system to:

receive permission information from the user, the permission information including authorized users and access categories associated with each of the authorized users;

receive a request to access a requested test report from a requesting user who is one of the authorized users;

determine that the requesting user is not permitted to access the requested test report using the access categories associated with the requesting user and at least one of:

an identifier of the requested test report and a project associated with the requested test report;

and prevent the requesting user from accessing the requested test report.

10. The system of claim 4 wherein the memory stores further computer-executable instructions that, when executed by the one or more processors, cause the system to generate summary information for each of the test results, the summary information including at least one of:

a time required to compile program code of the corresponding software module to generate the corresponding instance of the software project;

a time required to obtain the test results;

a number of errors encountered during compilation of the program code of the corresponding software project; and a number of failed tests encountered while attempting to build the corresponding instance of the software project.

11. The system of claim 4 wherein the memory stores further computer-executable instructions that, when executed by the one or more processors, cause the system to generate summary information for each of the test results, the summary information including at least one of:

a time required to compile program code of the corresponding software module to generate the corresponding instance of the software project;

a number of errors encountered during compilation of the program code of the corresponding software project; and a number of failed tests encountered while attempting to build the corresponding instance of the software project.

12. A system comprising one or more processors and memory storing computer-executable instructions that, when executed by the one or more processors, cause the system to:

receive test outcome definitions from a user of a computing resource service provider via a user interface of the computing resource service provider, each test outcome definition providing rules for assigning an outcome indicator belonging to a predetermined set of outcome indicators to each of a set of outputs of a software testing framework executable within a virtual computing environment of the computing resource service provider;

determine that the test outcome definitions omit rules for assigning an outcome indicator belonging to the predetermined set of outcome indicators to a particular output of the software testing framework;

augment the test outcome definitions with a default rule for assigning an outcome indicator belonging to the predetermined set of outcome indicators to the particular output of the software testing framework;

receive test results from respective reporting agents executing in the virtual computing environment within respective build containers, each reporting agent configured, during execution of that reporting agent, to:

attempt to build a corresponding instance of a software project including software modules; while attempting to build the corresponding instance of the software project, execute a test run including a plurality of tests according to a request received from a user, thereby producing test outputs for each test included in the test run, the test outputs being produced by the software testing framework; and generate and store the test result for the corresponding instance of the software project including individual test outcomes represented by an outcome indicator from the predetermined set of outcome indicators assigned to each test output according to the test outcome definitions; and provide the individual outcome indicators to the user as part of a test report provided by the user interface of the computing resource service provider.

13. The system of claim 12, wherein the memory stores further computer-executable instructions that, when executed by the one or more processors, cause the system to perform a user-defined action in response to one or more of the following:

determining that the test run has failed;

determining that the test report includes a particular outcome indicator; and determining that a time required to execute the test run exceeded a predetermined threshold.

14. The system of claim 12, wherein the memory stores further computer-executable instructions that, when executed by the one or more processors, cause the system to perform at least one of the following as the user-defined action:

providing a user-defined notification to the user;

terminating the attempt to build the corresponding instance of the software project; and altering a build parameter and attempt to build attempt to build the corresponding instance of the software project with the altered build parameter.

15. The system of claim 12, wherein the memory stores further computer-executable instructions that, when executed by the one or more processors, cause each reporting agent to:

receive an input format definition specifying an expected format of the test outputs;

receive an output format definition specifying a desired test result format;

extract information from portions of each test output identified by the input format definition;

provide the extracted information in the test results according to the output format definition.

16. The system of claim 15, wherein the memory stores further computer-executable instructions that, when executed by the one or more processors, cause the system to receive a user-defined test output format from the user as the input format definition.

* * * * *